United States Patent [19]

Girerd

[11] Patent Number: 4,863,334
[45] Date of Patent: Sep. 5, 1989

[54] ROLL-ON, ROLL-OFF HANDLING DEVICE AND ELEMENT FOR CONTAINERS OR THE LIKE

[75] Inventor: Marc P. M. Girerd, Ladon, France
[73] Assignee: Toutenkamion, Ladon, France
[21] Appl. No.: 141,362
[22] PCT Filed: Apr. 23, 1987
[86] PCT No.: PCT/FR87/00137
  § 371 Date: Dec. 14, 1987
  § 102(e) Date: Dec. 14, 1987
[87] PCT Pub. No.: WO87/06570
  PCT Pub. Date: Nov. 5, 1987

[30] Foreign Application Priority Data
Apr. 24, 1986 [FR] France ................... 86 05968

[51] Int. Cl.$^4$ ............................................. B60P 3/40
[52] U.S. Cl. ....................................... 414/458; 414/498
[58] Field of Search ............... 414/458, 495, 494, 497, 414/498; 280/35; 254/8 R, 45, 124

[56] References Cited

U.S. PATENT DOCUMENTS

| | | | |
|---|---|---|---|
| 3,243,193 | 3/1966 | Fulmer et al. | 414/458 X |
| 3,497,231 | 2/1970 | Fulmer et al. | |
| 3,631,999 | 1/1972 | Walerowski | 414/458 |
| 3,795,336 | 3/1974 | Acker et al. | 414/458 |
| 3,834,111 | 9/1974 | Acker et al. | |
| 4,348,149 | 9/1982 | Deamer | 414/458 |
| 4,458,786 | 7/1984 | Lèbre | 280/35 |
| 4,530,411 | 7/1985 | Grinwald | 280/35 X |
| 4,570,959 | 2/1986 | Grinwald | 414/458 X |

FOREIGN PATENT DOCUMENTS

| | | | |
|---|---|---|---|
| 872432 | 4/1953 | Fed. Rep. of Germany | 414/458 |
| 2154619 | 5/1973 | Fed. Rep. of Germany | 414/458 |
| 1459243 | 11/1966 | France | |
| 2109109 | 5/1972 | France | |
| 1220961 | 3/1986 | U.S.S.R. | 414/458 |

OTHER PUBLICATIONS

"Train TMTS 10", *LOHR pamphlet*, Ref. 1435, F0000 28 886.
"Mise au sol RMTS 10", *LOHR pamphlet*, Ref. 1439, F000 38 890.
"Mise au sol TCMTS 10", *LOHR pamphlet*, Ref. 1442, F000 28 896.

*Primary Examiner*—Robert J. Spar
*Assistant Examiner*—Robert S. Katz
*Attorney, Agent, or Firm*—Young & Thompson

[57] ABSTRACT

An improved roll-on, roll-off handling device is provided adapted to lift one end of a container and to maintain it in the raised position during handling and displacement of the container, said device comprising a chassis; a wheel system for supporting the chassis upon the ground; a carriage mounted on said chassis and displaceable along the longitudinal axis of said chassis; an apron removably attachable to one face of a container; a jack for pivotally displacing said apron with respect to said chassis and for moving said carriage and said chassis with respect to each other along the longitudinal axis of said chassis, whereby a container can move from a position in which said container rests on the ground with the chassis in a tilted position to a raised position in which said end of the container is raised and overlies part of the chassis.

12 Claims, 9 Drawing Sheets

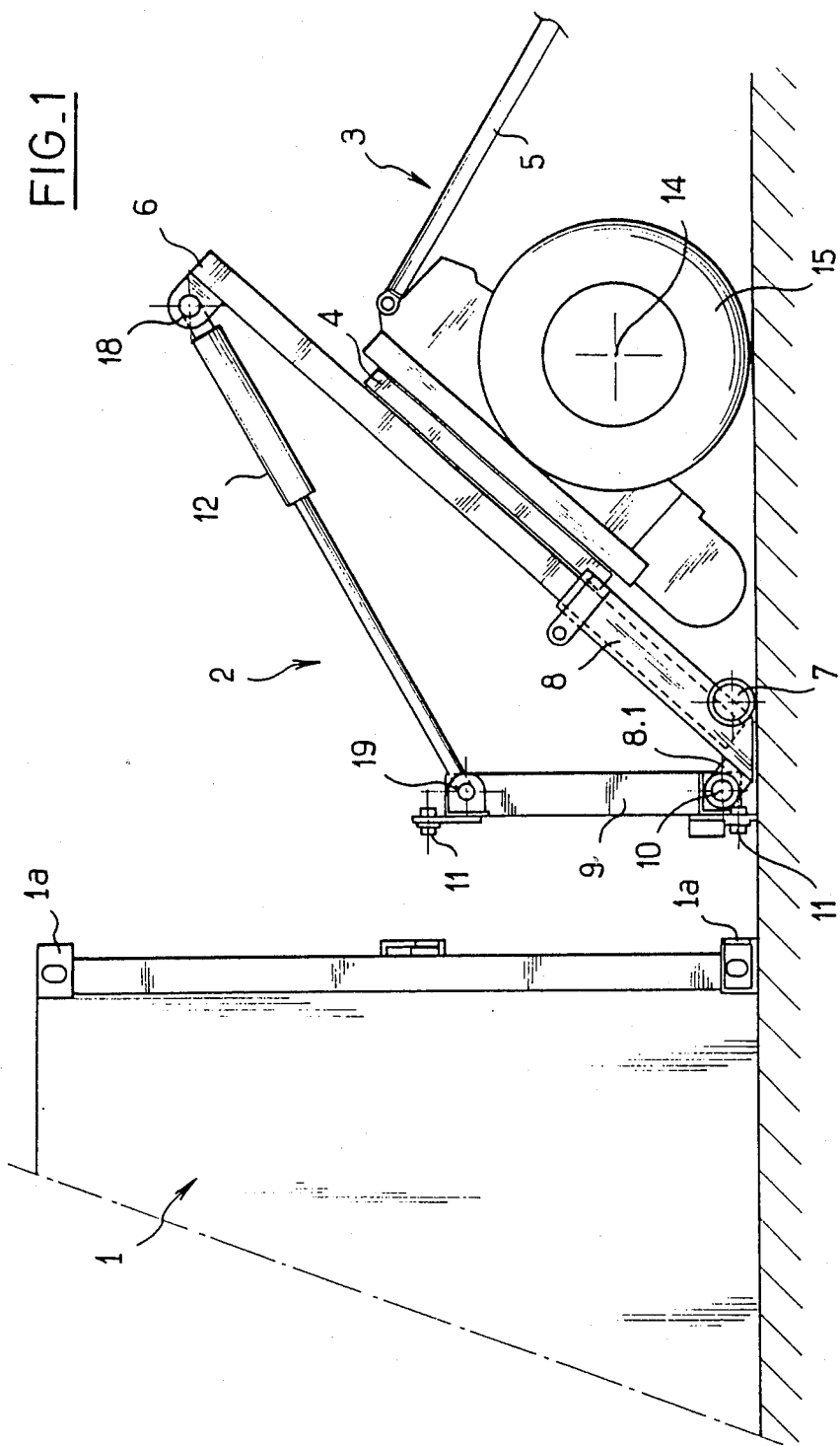

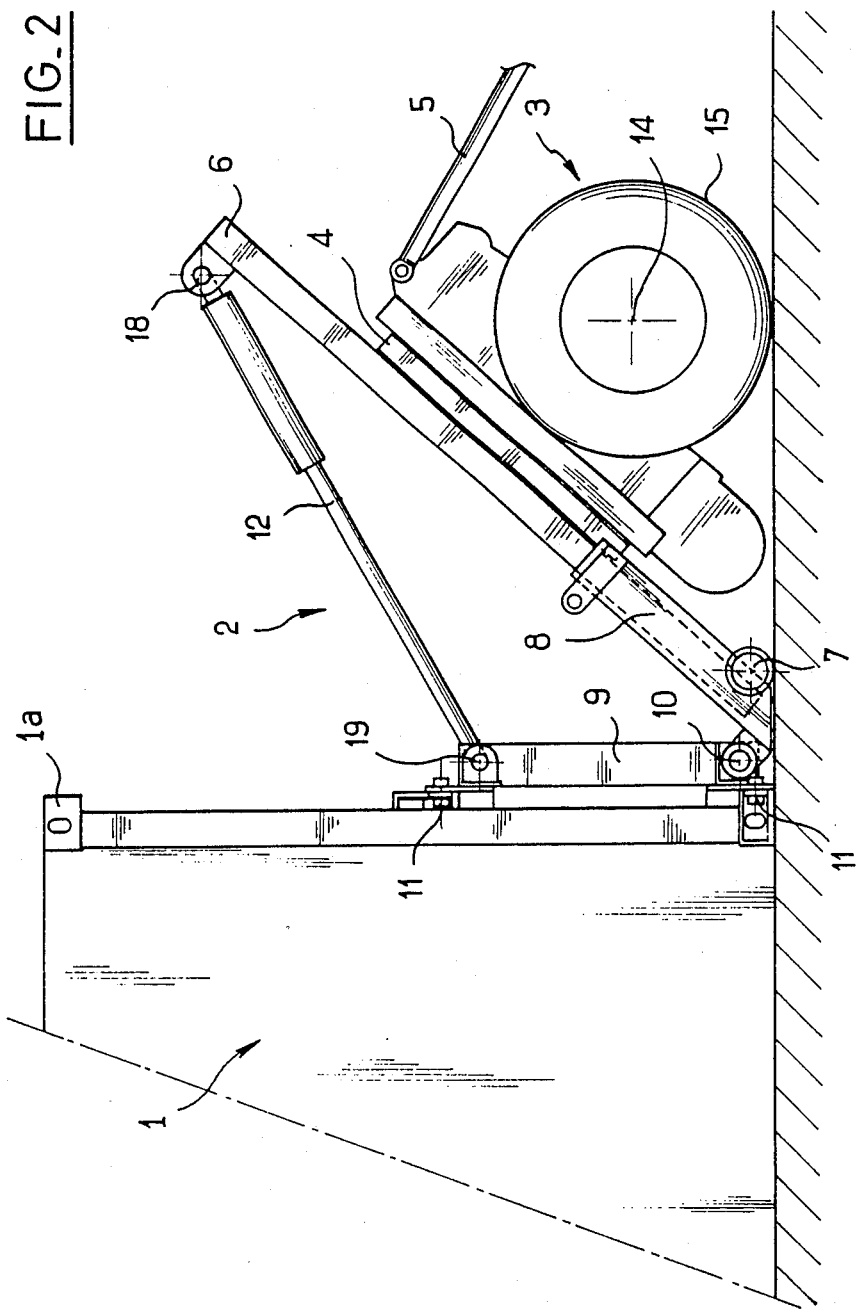

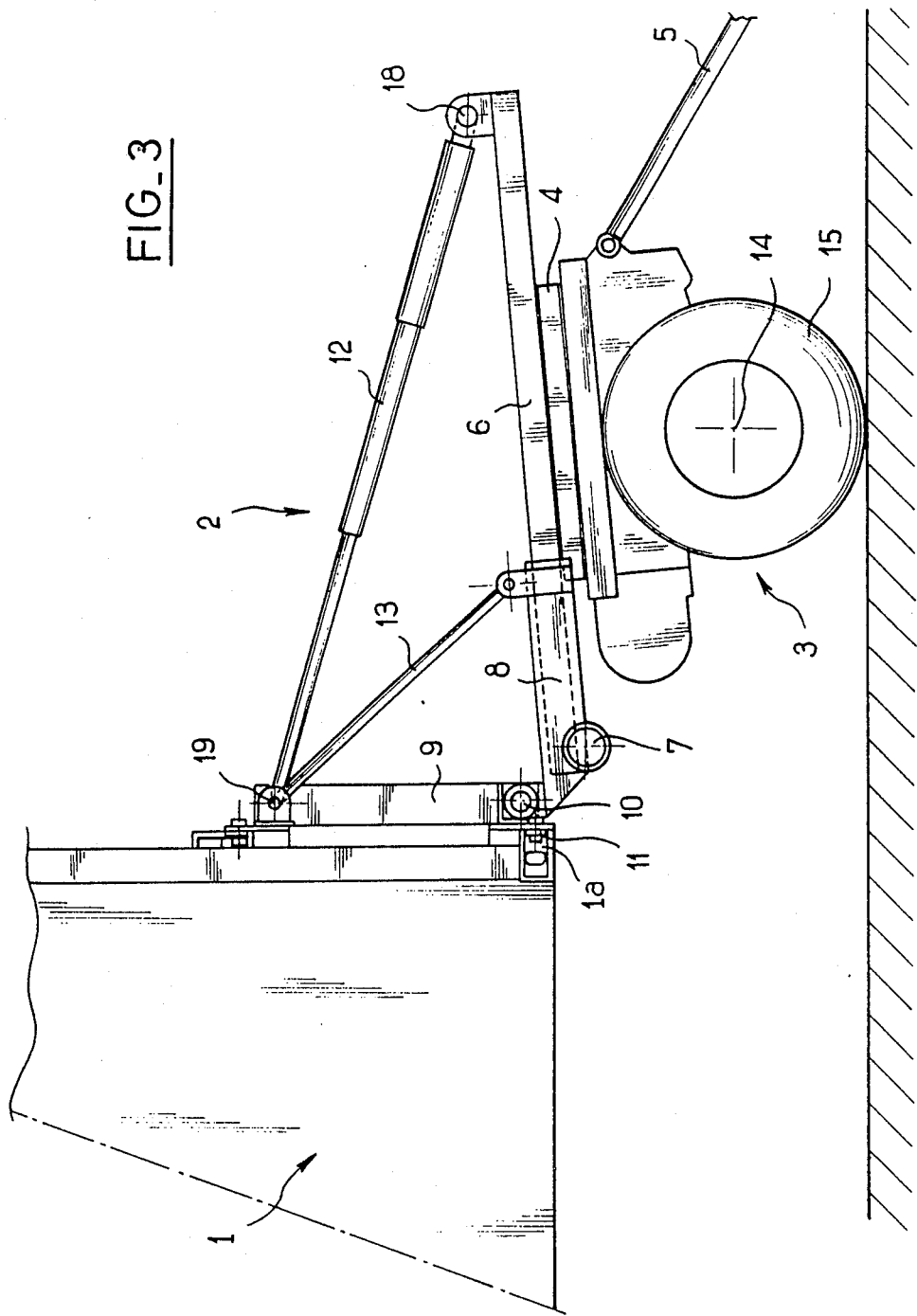
FIG_3

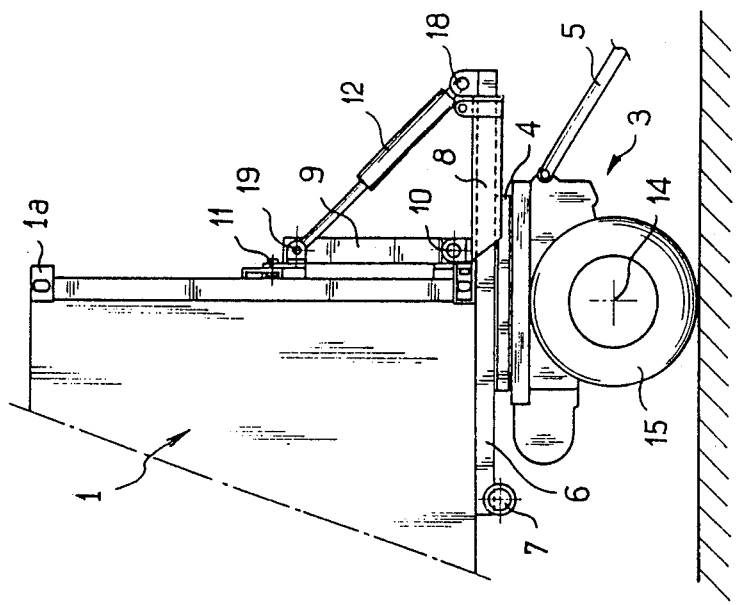
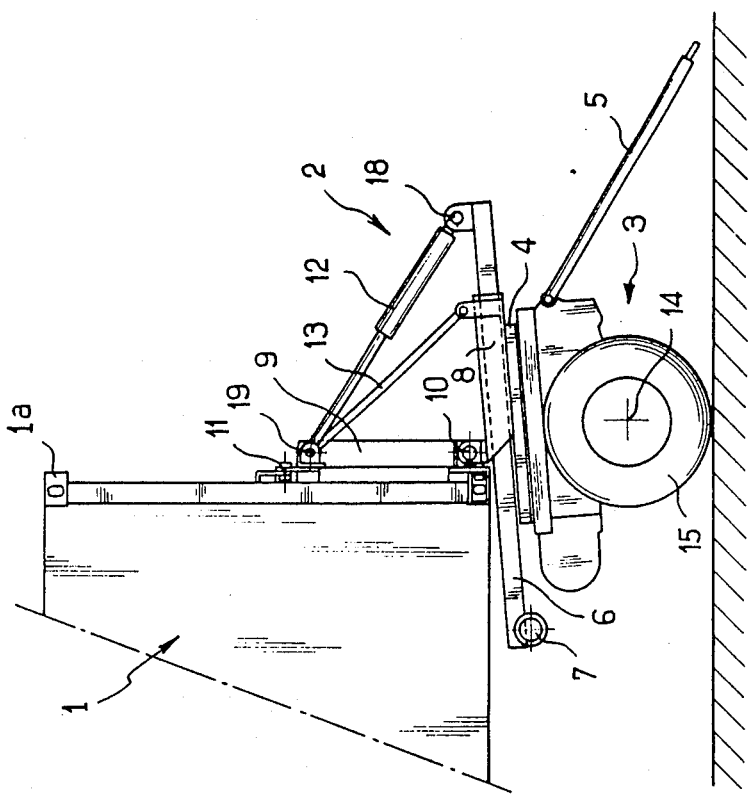

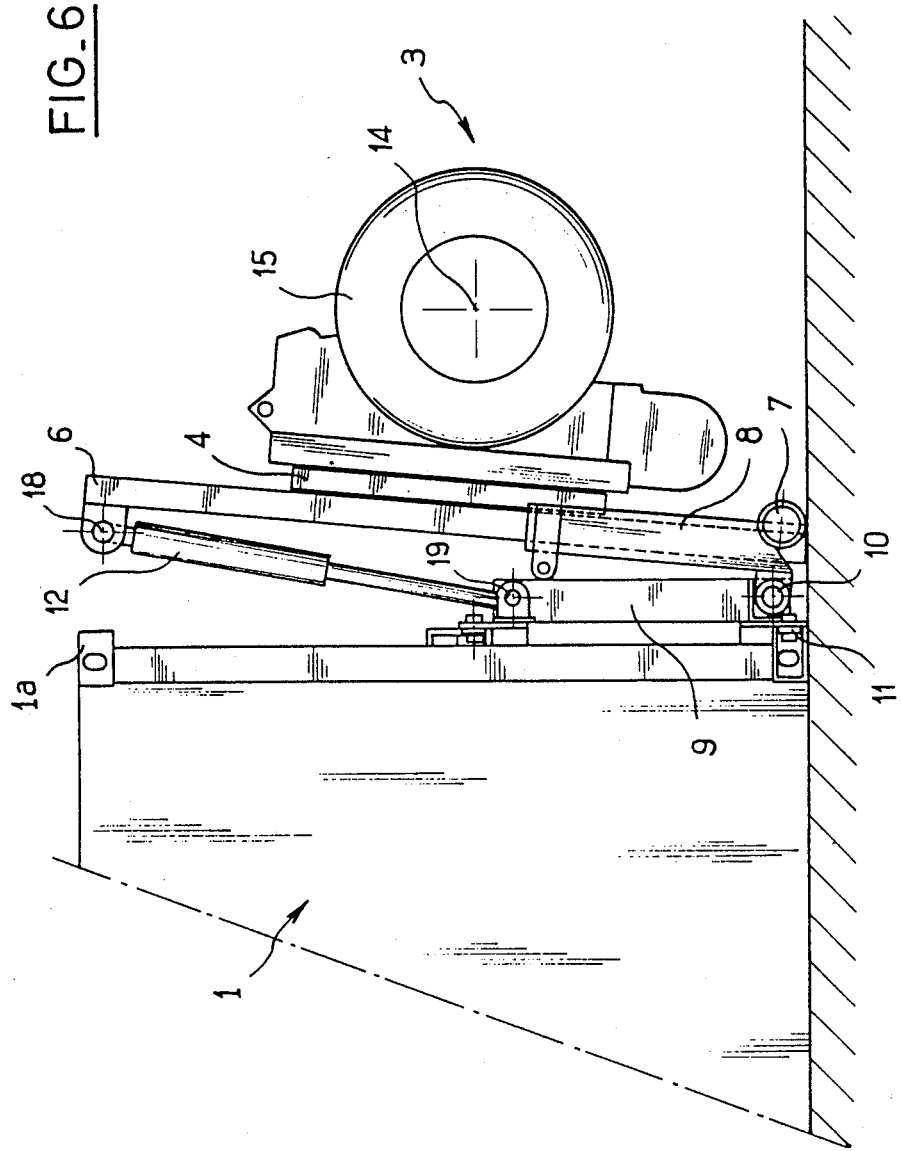

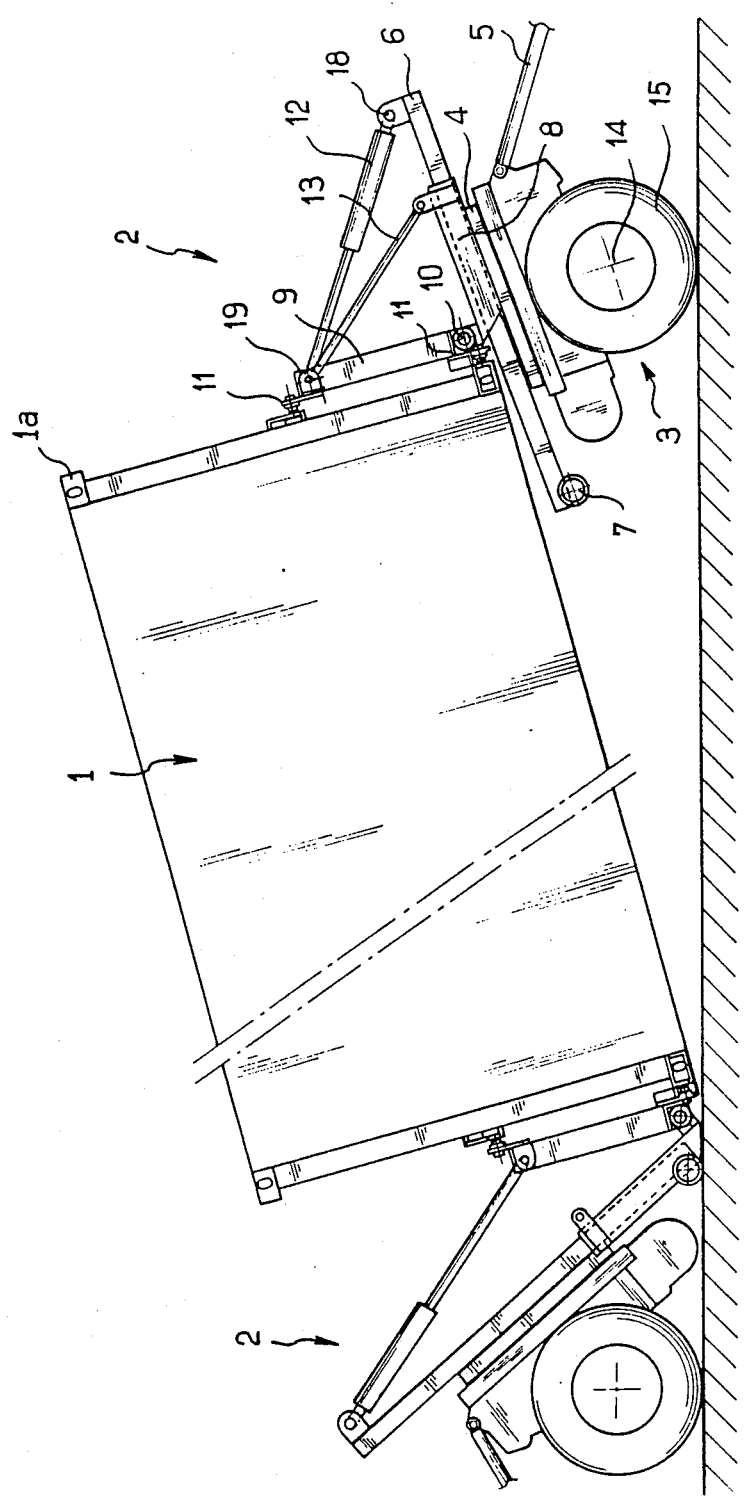
FIG_7

FIG_10
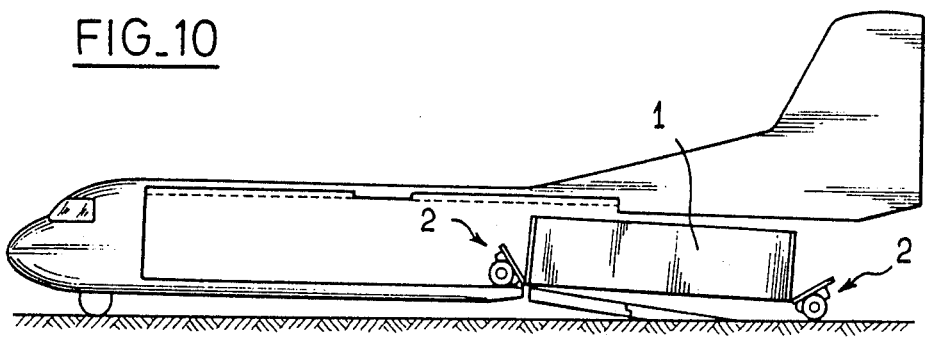
FIG_11
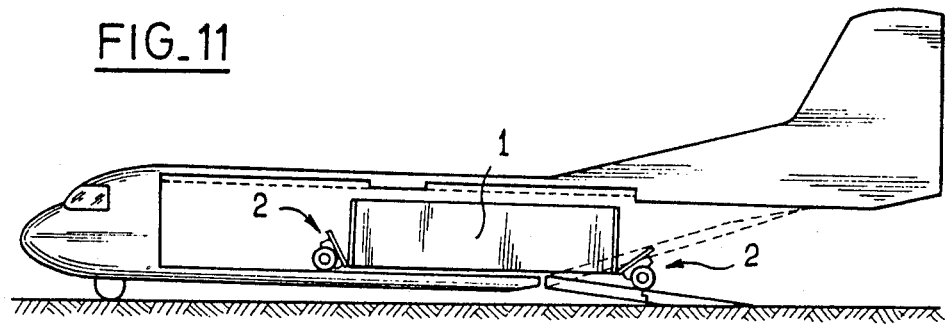
FIG_12
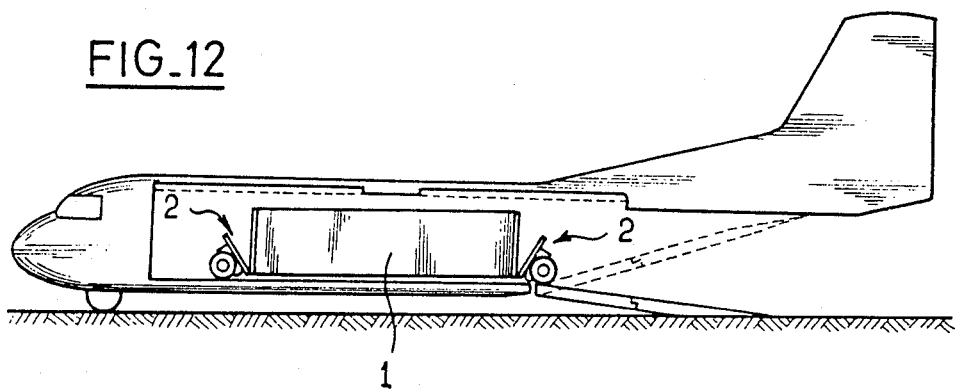

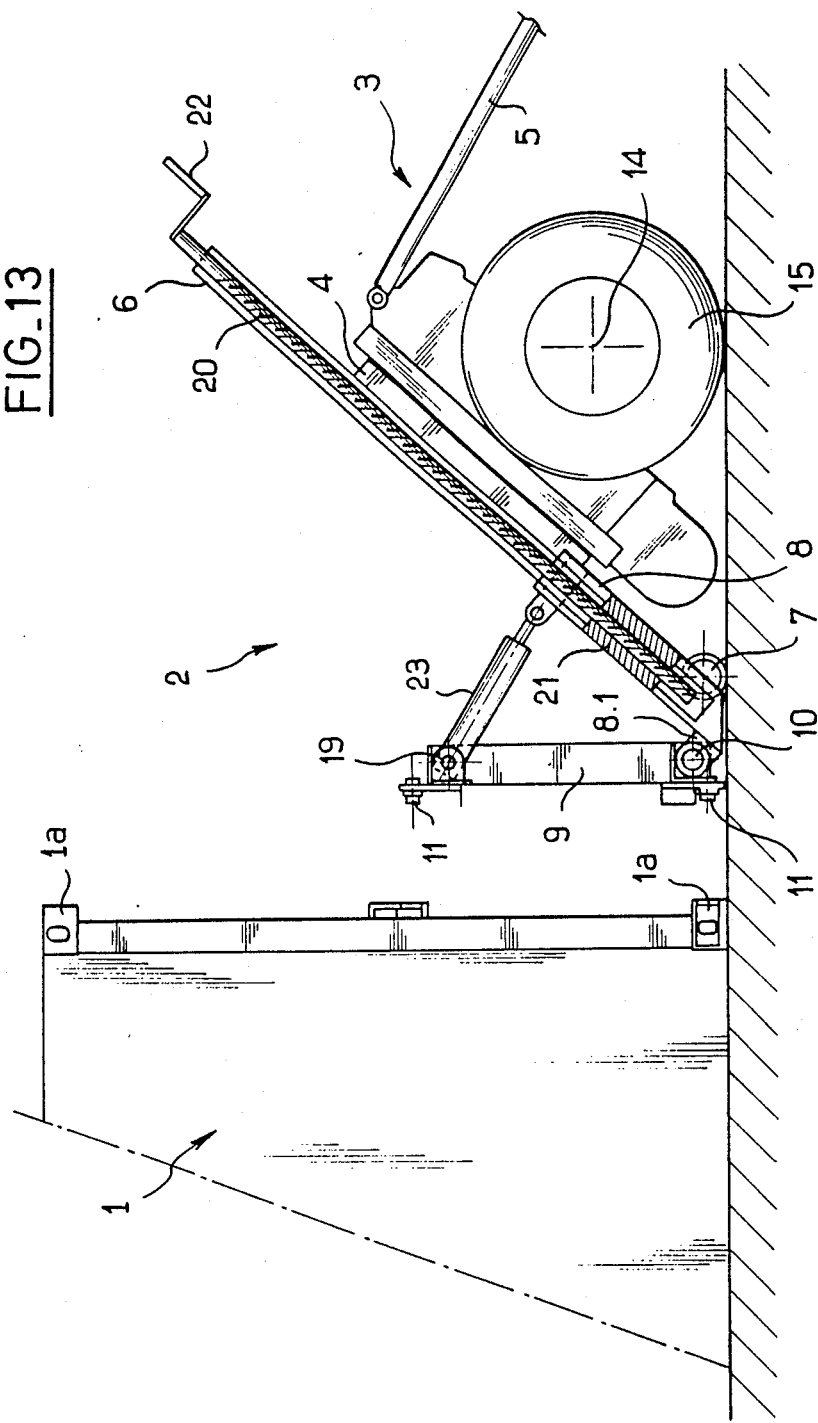

ROLL-ON, ROLL-OFF HANDLING DEVICE AND ELEMENT FOR CONTAINERS OR THE LIKE

The present invention is an improvement to a roll-on, roll-off handling device which is intended to be mounted on wheels and adapted to lift one end of a container and to maintain it in the raised position during displacement or handling of the container, this element comprising:

a chassis, an apron provided with means for removable attachment to one face of a container and articulated with respect to the chassis, and means for adjusting the angle between the apron and the chassis.

In a device of this type, the apron is pivoted to the chassis at one extremity of this latter.

In order to carry out a handling operation, the chassis is inclined in such a manner as to ensure that said extremity is adjacent to the ground, whereupon the apron is attached to the container. After this, the angle between apron and chassis is varied in such a manner as to ensure that the chassis pivots towards the horizontal whilst the container is lifted. A similar device carries out the same operation at the other end of the container. During the displacement which follows, the container remains suspended between the two devices each mounted on wheels. The result thereby achieved is that the attachment between the container and each apron is subjected to all the stresses of road transport. The container is subjected to high bending stresses. The resultant wheel-base of the rolling unit (distance between the axles from one device to the other) is excessive.

The object of the invention is to improve the known device in order to remove therefrom the disadvantages which have been mentioned in the foregoing.

In accordance with the invention, the device is characterized in that the apron is pivotally mounted on a carriage which is axially displaceable along a chassis serving as a ramp chassis in a direction transverse to the axis of pivotal connection between the apron and the carriage, the pivotal axis being adjacent to one extremity of the chassis when the carriage is in an end position.

Thus, when lifting of the container is completed, the carriage is displaced along the chassis so as to engage the chassis beneath the container and steps are taken to ensure that the container rests on the chassis during a road tip, a handling operation, and so on. The container is therefore subjected to distinctly less unfavorable stresses. Moreover, the engagement of the chassis beneath the container at each end of this latter reduces the wheel-base of the assembly and restores it to an acceptable value in regard to the maximum permissible values. The invention thus provides the means of very readily constructing a road-transport unit (which is capable of traveling at speeds of the order of 100 km/h) with very simple means which can very easily be put to use on the basis of a container which does not require any preliminary arrangement other than the attachment means usually imposed by current standards.

Preferably, the means for adjusting the angle between the apron and the chassis comprise a jack pivotally attached to the apron at a distance from the pivotal axis and to the chassis at a distance from the aforesaid extremity thereof, and the means for adjusting the angle between the apron and the chassis further comprise means for selectively locking the apron in position with respect to the carriage in order to ensure that the jack is capable on completion of the locking operation of serving to displace the carriage along the ramp-chassis.

Thus the same jack serves to orient the apron with respect to the chassis and to displace the carriage axially along the chassis, depending on whether the locking operation is achieved or not.

The means for selectively locking the pivotal displacement of the apron can comprise at least one removable spacer member for triangulating the apron and the carriage.

The means aforesaid are advantageously capable of locking the apron in a position in which the chassis makes an angle of slightly less than 90° with the container face concerned when the apron is attached to this latter.

When the apron is locked in this position, the carriage can be displaced along the chassis in order to engage the chassis beneath the container without producing any friction between chassis and container. At the end of this operation, the apron is again actuated in order to allow the container to rest on the chassis.

Preferably, a caster or the like is mounted on the chassis in the vicinity of the aforesaid extremity of this latter, this caster being positioned so as to be in contact with the ground when the apron is in a suitable position for attachment to one face of the container.

By virtue of this caster, the device can be moved towards the container whilst the apron is very close to the ground without any scraping on the ground.

Advantageously, the apron can be fixed in a position in which it is folded-back against the chassis with fixing means which are capable of retaining the chassis in a substantially vertical position against the apron when the apron is attached to a container.

Thus the device is capable of assuming an inactive position in which it is retracted against one face of the container. This is very convenient within the hold of a freight plane.

In another embodiment of the means for adjusting the angle between the apron and the chassis, these latter comprise a jack pivotally attached to the apron and to the carriage at a distance from their axis of relative pivotal displacement whilst a second jack such as a screw and nut system extending in the direction transverse to the aforesaid pivotal axis adjustably positions the carriage along the ramp-chassis. In this manner, there is no longer any removable spacer member to be handled and the efforts of displacement of the carriage are parallel to the direction of this displacement, thus reducing stresses and eliminating problems related to jamming hazards.

The chassis can comprise means for mounting it on a vehicle with a possibility of pivotal displacement about an axis parallel to and distant from the pivotal axis between apron and carriage.

In accordance with another aspect, the invention relates to a roll-on, roll-off handling element comprising a device in accordance with the first aspect in which the chassis is attached to a wheel system.

Preferably, the wheel system is directionally orientable with respect to the chassis.

If the wheel system of one of the elements employed for supporting the container has two directionally fixed axles, the two wheel systems can be oriented in such a manner as to ensure that the axis of their wheels is directed along the length of the container in order to displace this latter laterally.

Thus, by making use of all or part of the features mentioned above, it is possible by means of two roll-on, roll-off handling elements which may or may not be identical:

to take a container which is resting on the ground, to lift this latter to approximately 1.6 m above the ground, whether the load is maintained horizontal or not, to displace the container in all positions of the previous movement, thus making it possible for example to load a military transport plane, to position the container rapidly and accurately in the three axes on any terrain which is suitable for vehicles, to place the two roll-on, roll-off handling elements beneath the container so as to constitute a road-vehicle trailer, to adjust the wheel-base and the position of the axles with a view to ensuring better distribution of loads, to be drawn or pushed by a vehicle indifferently in one direction or in the other, to be drawn and pushed jointly by two vehicles, subject to the reservation that one of the two roll-on, roll-off handling elements has a double axle in order to prevent the center of gravity of the trailer from passing beyond its sustentation polygon, to draw the elements independently or one behind the other for displacing them when empty, to place the two roll-on, roll-off handling elements at the end of a container within the volume-equivalent of a 10-foot (1 D.) container or in other words a length of twice five feet, to be self-positioned on a road-vehicle deck by means of a roller (round tube) and a mini-winch, to deposit a small container on a large railway flatcar from a loading platform at flatcar level but alongside the railway car.

Further particular features and advantages of the invention will also be brought out by the nonlimitative description given hereinafter.

In the accompanying drawings:

FIG. 1 is a view in elevation of a roll-on, roll-off handling element in the tricycle position, in the course of being moved towards a container;

FIGS. 2, 3, 4, 5 and 6 are views which are similar to FIG. 1 but show respectively the coupling of the container, the lifting position, the position of adjustment of wheel-base, the road-transport position and the retracted position;

FIG. 7 is a view in elevation to a smaller scale during handling;

FIGS. 8 to 12 show the five steps of loading of a container on board an aircraft;

FIG. 13 is a view which is similar to FIG. 1 but relates to a second embodiment.

Figures 8, 9:
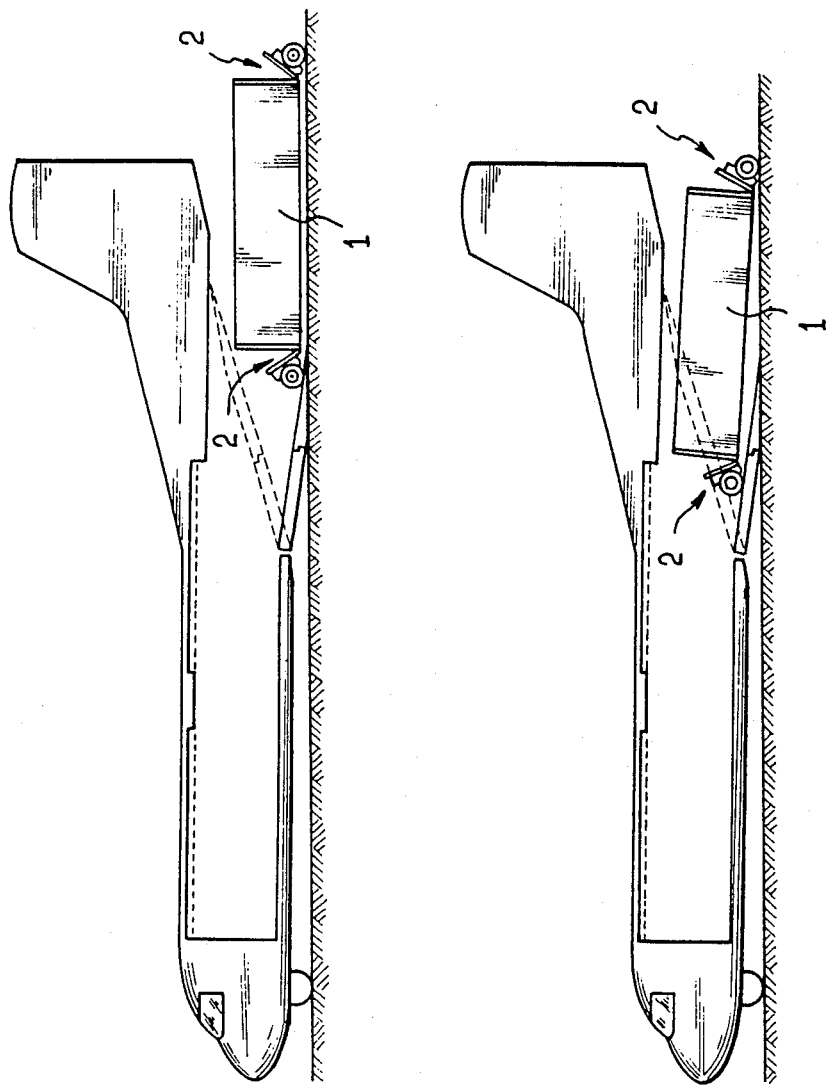

Each roll-on, roll-off handling element (2) (FIG. 1) is constituted by a steerable wheel system (3) with total rotation as employed for road transport with or without its brake system, suspension, its drawbar (5) and its lighting system. A ball-mounted turntable (4) permits directional orientation of an axle (14) equipped with wheels (15) with respect to a ramp-chassis (6) having a length usually smaller than eight feet, equipped with two parallel rails in spaced relation and perpendicular to the axis of the ball-mounted turntable (4).

Beneath a first extremity of this chassis (6) is fixed a pivoting caster (7) forming with the two wheels (15) of the axle (14) a tricycle which permits manual approach of each roll-on, roll-off handling element (2) (FIG. 1), the axle (14) being oriented at right angles to the rails of the chassis (6).

A carriage (8) which slides freely and longitudinally on the rails of the chassis (6) is equipped at one of its extremities with brackets (8.1) to which an apron (9) is pivoted about a horizontal axis (10) which is transverse to the rails and to the axis of the ball-mounted turntable (4).

This apron (9) constituted by a frame is equipped with one or a number of locking-bolts (11) provided for insertion and attachment within the standardized hole or holes of the front and rear faces of the corner-pieces (1a) of the containers (1).

At the second extremity of the chassis (6) is positioned the point of pivotal attachment (18) of a single or dual jack (12) which may be telescopic if necessary. This single or dual jack (12) is double-acting.

The other extremity of this jack (12) is pivoted to the apron (9) about a second pivotal axis (19) which is parallel to the first axis (10) and remote from this latter.

In the empty road-transport position, the apron (9) usually rests on the sliding carriage (8).

The articulations between sliding carriage (8) and apron (9), apron (9) and jack (12), and jack (12) and ramp-chassis (6), form the three vertices of a triangle, two sides of which are of variable length by sliding of the carriage on the ramp-chassis and respectively by action of the jack (12).

A connecting-rod (13) (FIGS. 3 and 4) or a pair of articulated extension struts makes it possible to maintain or not maintain the angle made by the apron (9) with respect to the sliding carriage (8), that is to say the angle between the plane in which the apron bears on the container and the direction of the rails of the chassis (6), with the result that this angle will have two privileged values, zero (see FIG. 5) and ninety minus X degrees (0° and 90°−X°). As a general rule, X is of the order of 10° or less (see FIG. 3).

Depending on whether the angle between apron (9) and sliding carriage (8) is locked or not, the action of the jack (12) and of gravity displaces the carriage (8) along the chassis (6) or respectively produces a variation in the angle between apron (9) and chassis (6).

The variation in the angle between apron (9) and chassis (6) produces a variation in the angle between chassis (6) and container (1) and performs a lever action on the container (1) about the axle (14) (see comparatively FIGS. 2 and 3).

Other systems already utilize said lever effect for lifting the container (1). However, the invention moreover permits the possibility of sliding the roll-on, roll-off handling element (2) beneath the container (1). This is possible by means of the following operation:

when the angle of 90°−X° has been reached, the angle-locking connecting-rod (13) is placed in position (FIG. 3), the action of the jack (12) is then reversed, thereby causing the carriage (8) to slide on the chassis (6) (FIGS. 4 and 5), sliding on the chassis (6) causes the container (1) to slide on the roll-on, roll-off handling element (2) or, better still, causes the roll-on, roll-off handling element (2) to slide beneath the container (1) whilst the wheels (15) roll on the ground.

Progressively as the sliding carriage (8) draws nearer to vertical alignment with the axis of the wheels (15), the compressive forces exerted on the connecting-rod (13) decrease to zero, then change-over to extension forces which become progressively larger as the carriage (8) moves away to the other side of the axis of the ball-mounted turntable (4) (FIG. 4).

When the carriage (8) arrives at the end-of-travel stop, the jack (12) which is undergoing a movement of withdrawal nullifies the extension forces exerted on the connecting-rod (13).

It is then possible to detach the connecting-rod (13) before fully releasing the pressure within the jack (12) and suppressing its tractive force on the apron (9). The container (1) comes to rest on the roll-on, roll-off handling element (2) (FIG. 5).

In order to prevent any error of operation, a means locking the carriage (8) against sliding motion is automatically enabled upon said detachment of the connecting-rod (13).

Since the position of the carriage (8) has been reversed with respect to the axis of the ball-mounted turntable (4), the leverage effect which is utilized in order to lift the container (1) off the ground applies the chassis (6) beneath the container (1). Thus the container (1) comes to rest and is locked on the roll-on, roll-off handling element (2).

Independently from the foregoing or in conjunction therewith, the same steps are performed with the other roll-on, roll-off handling element (2) at the other end of the container (FIG. 7).

Depositing on the ground is effected by applying the reverse process with respect to that described.

A system of piping and electric wiring serves to connect the roll-on, roll-off handling elements (2) internally or externally to each other and to the tractor.

As shown in FIGS. 8 to 12, in order to load a container on board a freight plane having a cargo hatch which makes a significant angle with the cargo-space floor, the roll-on, roll-off handling elements are placed in the hoisting position and, by means of the jack (12), the height of each extremity of the container is so adjusted as to take into account as far as possible the requirements of ground clearance and available height.

The elements in accordance with the invention also permit loading of a container onto a low truck-van deck. One of the elements being initially retracted at one end of the container (as shown in FIG. 6), the deck is backed-up to the container. Action on the jack serves to bring the wheels of the element to bear on the deck. The element is held in a fixed position on the deck by means of the winch which is usually provided on the deck. The rear element, then the front element are placed in the hoisting position. By means of the winch, the complete assembly is drawn onto the platform while the front element rolls on the platform and the rear element rolls on the ground. If the platform is of substantial length, a roller or rolling tube is placed between container and platform in order to complete the forward displacement on the platform whilst the rear element is retracted.

The embodiment represented in FIG. 13 again shows all the elements of the first embodiment except for the jack (12) and the connecting-rod (13). A double-acting jack (23) is pivoted to the apron (9) about the axis (19) and to the carriage (8) about an axis parallel to the axis (10) and located at a distance from this latter near the second extremity of the chassis (6). In short, the jack (23) is permanently mounted at the location in which the connecting-rod (13) was selectively mounted in the preceding embodiment. By "permanently" is meant "without any need for disassembly during use".

Moreover, the carriage (8) carries a stationarily fixed nut (21) having a screw-thread engaged with a screw (20) rotatably carried by the chassis (6). The screw (20) is parallel to the rails and extends substantially over the entire length of the chassis. A hand crank (22) serves to rotate the screw (20) in order to displace the carriage (8) along the chassis (6).

The element (2) thus constituted is employed as follows:

At the outset (FIG. 13), the carriage (8) is in the end position nearest the caster (7) and the jack (23) sets the angle between apron (11) and carriage (8) at approximately 45°. Once the locking-bolts (11) are in position within the corner-pieces 1a of the container (1), the jack (23) is actuated in a movement of extension until the aforementioned angle is 90° − X°. The hand crank (22) is then actuated so as to displace the carriage (8) towards its other end position whilst the jack (23) locks the angle. Finally, the action of the jack (23) is stopped in order to allow the load to rest on the chassis as explained earlier in connection with the preceding embodiment.

This embodiment does not permit the retracted position of FIG. 6. On the other hand, its construction is advantageous since the screw (20) urges the carriage (8) in the direction of displacement, therefore without any risk of jamming, with the result that the carriage (8) is capable of resting on rails without any problem by means of shoes of large size rather than by means of rollers. Accordingly, the chassis which is no longer subjected to any localized stress either by the carriage or by the jack (12) of FIGS. 1 to 4 can be considerably reduced in weight.

What is claimed is:

1. Roll-on, roll-off handling device adapted to lift one end of a container and to maintain it in the raised position during handling and displacement of the container, said device comprising:

a chassis;

means for supporting the chassis upon the ground which means permits pivotal movement of said chassis with respect to the ground about a first axis parallel to the ground, said chassis pivoting about the first axis from a tilted position in which a first end of the chassis is adjacent to the ground and a raised position in which said first end is spaced from the ground;

a carriage mounted on said chassis and displaceable along the longitudinal axis of said chassis, said longitudinal axis being transverse to said first axis;

an apron removably attachable to one face of a container, said apron being connected to said carriage and adapted for pivotal movement with respect to both said carriage and said chassis about a second axis substantially parallel to said first axis;

means for pivotally displacing said apron with respect to said chassis about said second axis;

means for moving said carriage and said chassis with respect to each other along the longitudinal axis of said chassis, said carriage being movable between an advanced carriage position in which said second axis is adjacent said first end of the chassis and spaced from said first axis, and a container supporting position in which the second axis is displaced toward an opposed second end of the chassis, thereby to allow movement of a container from a position in which said container rests on the ground with the chassis in its tilted position and the carriage in its said advanced carriage position, to a position in which, after movement of the chassis to said raised position and of the carriage to its container supporting position, said end of the container is raised and overlies part of the chassis.

2. A device in accordance with claim 1, wherein the means for pivotally displacing the apron comprises a jack pivotally attached to the apron at a point spaced from the second axis and to the chassis at a point spaced from the first end thereof.

3. A device in accordance with claim 2, comprising means for selectively locking the apron with respect to the carriage against relative pivotal displacement about said second axis whereby actuation of the jack entails displacement of the carriage along the chassis when the apron is locked with respect to the chassis against said relative pivotal displacement.

4. A device in accordance with claim 3, wherein the means for selectively locking the apron with respect to the chassis comprise at least one removable spacer member for triangulating the apron and the carriage.

5. A device in accordance with claim 1, comprising means for releasably locking the apron with respect to the chassis in a position in which the chassis makes an angle of slightly less than 90° with a face of the container to which face the apron is, in use, attached.

6. A device in accordance with claim 1, further comprising fixing means capable of retaining the chassis in a substantially vertical position against the apron when the apron is attached to a container.

7. A device in accordance with claim 1, wherein the means for pivotally displacing the apron and the chassis with respect to each other comprise an apron-actuating jack pivotally attached to the apron at a point spaced from the second axis and to the carriage at a point spaced from the second axis.

8. A device in accordance with claim 1, wherein said means for moving the carriage and the chassis with respect to each other comprises a carriage actuating jack which extends along said longitudinal axis of the chassis and is capable of adjustably positioning the carriage along the chassis.

9. A device in accordance with claim 1, comprising a caster mounted on the chassis in the vicinity of said first end of said chassis, this caster being positioned so as to abut the ground when the chassis is in said tilted position about said first axis.

10. A device in accordance with claim 1, wherein said means for supporting said chassis upon the ground comprises means for pivotally attaching said device to a vehicle.

11. A device in accordance with claim 1, wherein said means for supporting said chassis upon the ground comprises a supporting wheel system.

12. A device in accordance with claim 11, wherein the wheel system is directionally orientable with respect to the chassis.

* * * * *